United States Patent [19]
Wolf

[11] Patent Number: 4,863,025
[45] Date of Patent: Sep. 5, 1989

[54] PACKAGE FOR RECORDING MEDIA

[76] Inventor: Hans-Joachim Wolf, Theodor-Schweitzer-Str. 1, 7137 Sternenfels, Fed. Rep. of Germany

[21] Appl. No.: 263,022

[22] Filed: Oct. 27, 1988

[30] Foreign Application Priority Data

Oct. 27, 1987 [DE] Fed. Rep. of Germany ....... 3736239

[51] Int. Cl.$^4$ .......................................... B65D 85/672
[52] U.S. Cl. .................................................... 206/387
[58] Field of Search ......................................... 206/387

[56] References Cited

U.S. PATENT DOCUMENTS

| | | | |
|---|---|---|---|
| 3,904,259 | 9/1975 | Hoffmann et al. | 206/387 X |
| 4,046,255 | 9/1977 | Ackeret | 206/387 |
| 4,055,372 | 10/1977 | Tozawa et al. | 206/387 X |

FOREIGN PATENT DOCUMENTS

| | | | |
|---|---|---|---|
| 492238 | 4/1977 | Australia | 206/387 |
| 3247796 | 7/1984 | Fed. Rep. of Germany | |
| 2478361 | 9/1981 | France | 206/387 |
| 2154550 | 7/1985 | United Kingdom | |

Primary Examiner—William Price
Attorney, Agent, or Firm—Spensley Horn Jubas & Lubitz

[57] ABSTRACT

A case for video or audio cassettes composed of an upper housing part and a lower housing part that are foldably joined together by means of a hinge to completely enclose the cassette. At least one elastic element is installed between the upper part and the lower part in such a way that when a closure is disengaged the upper and lower parts are forced apart and the package swings open automatically. In particular, the cassette itself is located in a separate holder that is held between the upper part and the lower part in their common pivot axis, with the elastic elements then operating between this holder and the upper and lower parts. The effect of this is that when the closure, particularly a snap closure, is disengaged, not only do the upper and lower parts swing open automatically, but the holder with the cassette is brought into an angular position that roughly bisects the angle between the upper and lower parts when open. The cassette is thus easy to remove and to replace in the holder.

6 Claims, 2 Drawing Sheets

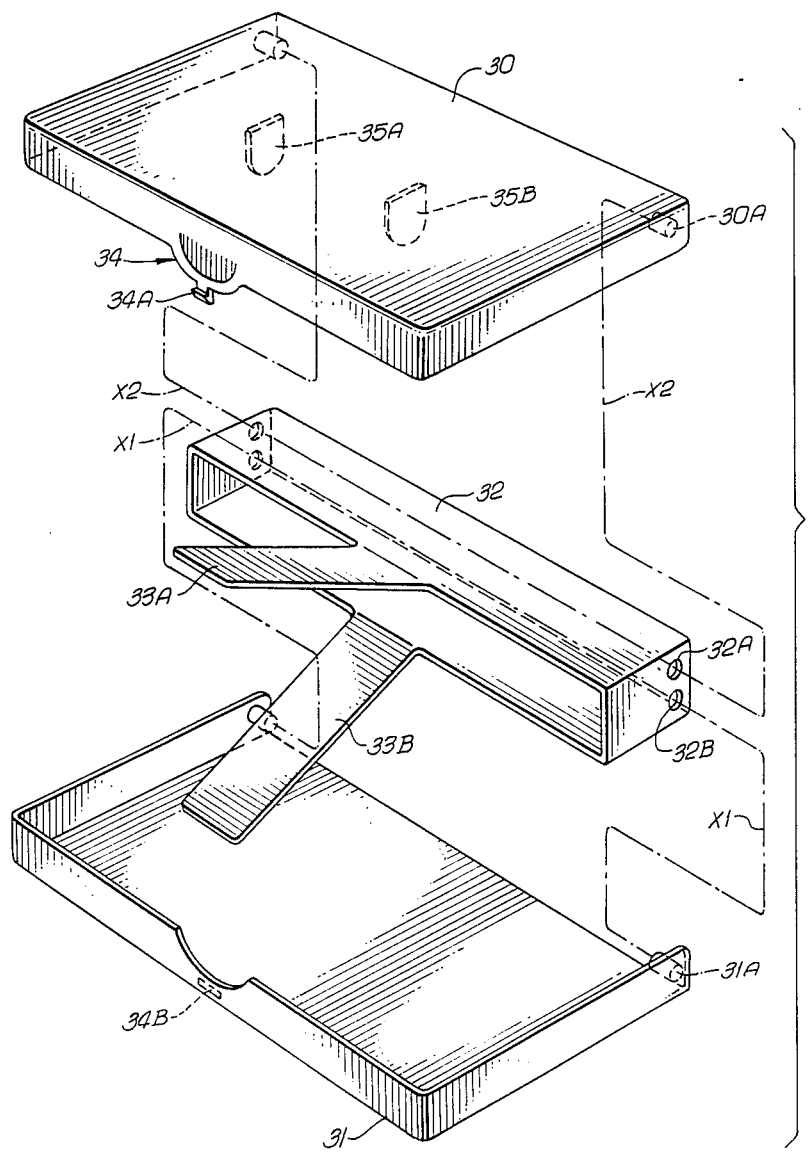

PACKAGE FOR RECORDING MEDIA

BACKGROUND OF THE INVENTION

The present invention relates to a package for flat recording media, e.g., video or audio cassettes or compact discs, which package has the form of a case composed of two parts joined by a hinge and completely enclosing the recording medium. The case contains a holder to receive the recording medium in such a way that it presents the recording medium when a closure is disengaged. A package of this type is disclosed in GB-A No. 2,154,550.

This prior known package consists of a plastic part made of polypropylene, with two parallel weakened lines serving as a hinge and defining between them a spine on the plastic part. The sides of the plastic part then form the upper and lower parts of the case.

Plastic strips running around three sides, which may be applied to the margins of the upper and lower parts, serve to form a caselike package with closed sides and to reinforce the upper and lower parts. A holder attached to the spine serves to receive the recording medium.

Due to the planar attachment of the back of the holder to the spine of the plastic part between the hinge lines, the holder exhibits a "pickup effect" when the upper and lower parts swing open, inasmuch as the holder swings up to a greater or lesser distance out of the lower part and away from the portion of the case formed by the lower part and its associated border. This intentional effect necessarily depends to a considerable extent on the weight of the recording medium, on operation by the user, and on the elastic properties of the plastic part in the region of the hinge lines. In the case of soft plastic material, the "pickup effect" described is necessarily rather weak, so that a specific operation is required of the user in order to raise the holder with the medium out of the lower part of the case. To be sure, this "pickup effect" is stronger in the case of harder plastic material, but the harder material is correspondingly more brittle and will experience fatigue sooner so that a case made of this material will have a shorter service life.

Since, therefore, the "pickup effect" is determined to a considerable extent by the selection of the material for the plastic part, it follows that it will also be affected by the external factors that effect the behavior of plastics, e.g., temperature or humidity, which will likewise affect the "life expectancy" of the hinge line.

All of these factors and interactions have the effect of precluding the creation of a definite presentation position when the package is opened.

Opening the prior known package is effected in that the frame that runs around the edges is contoured at least at some places in such a way that they interengage, thus achieving a catch closure due to friction. The structure of this catch closure in turn cannot be independent of the choice of material for the plastic parts and must take account of the resiliency force of the hinge lines, which force will tend to swing the case open. Independent of this, however, two hands are required to perform an initial opening procedure on this catch closure before the case more or less automatically presents the recording medium in a partially or completely suitable position for removal in the manner described above.

DE-A-13,247,796 likewise discloses a storage device for discoid recording media, but relates to a multiple package in which a complicated mechanism causes a fanlike arrangement to swing out. All of the components must be constructed in a relatively stable fashion, for example in order to contain the large moments of torque arising when the arrangement swings out. Finally, there is the structural complication created in this case by the kinematically unfavorable disposition of a coiled compression spring at the side of the case.

Compared to the arrangement disclosed in GB-A-2,154,550, the use of a separate elastic element in the structure of DE-A-13,247,796 does improve its swing-out behavior with respect to establishment of a definite position for removal but the design is obviously disproportionately complicated and expensive for use in a single package.

SUMMARY OF THE INVENTION

An object of the invention is thus to provide an improved package or case of this type which can be made of a material that ensures a constant presentation position even after long use and under varying temperatures, and in particular a constant angle of opening for removal of the recording medium.

Another object of the invention is to provide a package having the above characteristics and having a structure such that it can be fabricated with an injection molding tool of simple structure A further object of the invention is to provide a novel recording medium case which is simpler and more convenient to manipulate than those known in the art.

The above and other objects are attained, according to the invention, by a case constructed of three separate components, namely an upper part, a lower part, and a holder, with a blade or sheet spring element formed directly on at least one of these three components, wherein the free end of this spring element is resiliently supported against one or both of the other components or the centrally disposed recording medium for automatic opening.

Multiple possibilities are conceivable for the disposition of such a spring element, the decisive factor being that this spring element exert a force between at least one of the upper part or the lower part, on the one hand, and on the recording medium, on the other, in such a way that after disengaging the closure, e.g., a snap closure, this spring element pushes at least one part of the package away from the recording medium or from the holder, respectively, and lifts the one part together with the recording medium away from the other part of the package. This facilitates simple one-handed opening of the package.

It is more advantageous to provide at least one each of these spring elements between the upper part and the holder, on the one hand, and between the lower part and the holder, on the other hand, with the spring elements performing approximately the same action, so that when the closure is disengaged the package opens automatically to an angle determined by the elastic force of the spring elements, and so that the holder with the recording medium is positioned approximately in the plane that bisects the angle of opening between the upper part and the lower part. In this position, the front face of the recording medium is completely freed from the side walls of the upper and lower parts, so that it is a simple matter to extract the recording medium from the holder. This further simplifies operation inasmuch as the closure is operated with the one hand that holds the package without obstructing access to the cassette.

According to a further feature of the invention, the holder is pivotably held at the common axis of the hinge connecting the upper part and the lower part.

Finally, a further feature provides that the spring element or elements be formed of one or more S-shaped strips that lie between the upper part and the holder and/or between the lower part and the holder. The S-shape is particularly advantageous because the free end of the blade or sheet spring element slides on the opposing part of the package when the package is opened, and the bend in the end region of the spring element prevents damage to the opposing part of the package during the sliding.

To a great extent, the holder can overlap the back portion of the cassette as a full surface, but it can also be reduced to its essential components, for example to tracklike guide surfaces for insertion of the recording medium, e.g., the audio cassette, and working surfaces for the spring elements.

BRIEF DESCRIPTION OF THE DRAWING

Two exemplary embodiments of the package according to the invention will be described in greater detail with reference to the drawing, in which:

FIG. 3 is an exploded perspective view of a second exemplary embodiment with the cassette removed.

DESCRIPTION OF THE PREFERRED EMBODIMENTS

Figure 1:
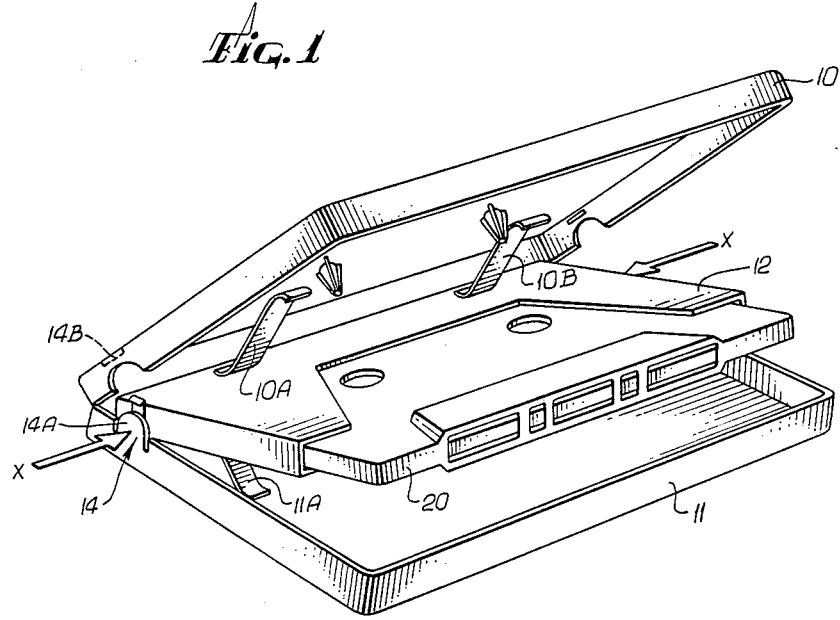
FIG. 1 is a perspective view of a first embodiment of the package with an audio cassette inserted.
Figure 2:
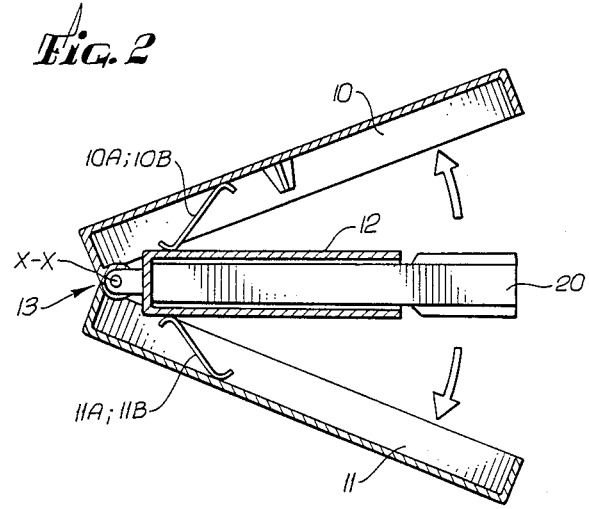
FIG. 2 is a cross-sectional view through the opened package with cassette inserted of FIG. 1

In the first exemplary embodiment, shown in FIGS. 1 and 2, the package or case is composed of an upper part 10 and a lower part 11, parts 10 and 11 being connected in a known manner by a hinge 13 having a hinge axis X—X in such a way that parts 10 and 11 completely enclose a cassette 20 when the case is in its closed position.

Furthermore, a holder 12 is mounted on hinge 13 to be pivotable about hinge axis X—X, holder 12 being disposed between upper part 1 lower part 11. Holder 12 can thus in principle assume any angular position between upper part 10 and lower part 11.

Holder 12 has an opening at its front, i.e. at the edge remote from hinge 13, roughly corresponding to the cross-section of a conventional tape cassette 20 so that cassette 20 can be slid into, and retained in, holder 12.

Spring elements 10A and 10B are disposed between upper part 10 and holder 12 and spring elements 11A and IIB are disposed between lower part 11 and holder 12.

When the case is closed, spring elements 10A–11B are compressed and the case is held in its closed condition by a closure composed of a latch member 14A mounted on part 11 and a latching recess 14B formed in part 10.

When the closure is disengaged by finger pressure in the direction of the arrows in FIG. 1, parts 10 and 11 swing apart to a predetermined angle of opening and simultaneously bring holder 12 with cassette 20 into an angular position that corresponds at least approximately to the bisector of the angle between upper part 10 and lower part 11, so that cassette 20 assumes approximately the position shown in FIG. 2.

In the exemplary embodiment shown here, S-shaped bent strips, made for example of plastic or metal, are provided as spring elements 10A ... 11B, one end of each strip being fixed either to holder 12 or to the upper or lower part, respectively, while the other end can slide freely on the respective opposing component.

In the exemplary embodiment shown, closure 14 is formed by an elastic part 14A on lower part 11, part 14A having an upwardly-directed tongue carrying a latch element which can engage in the corresponding recess or indentation 14B in upper part 10. It is self-evident that a multiplicity of such snap closures can be used either on the side walls or on the front walls of the upper and lower parts, the basic requirement being merely that they be scaled such that the holding moment they exert when the case is closed be greater than the opening moment exerted by spring elements 10A...11B at the hinge axis X—X.

As further depicted in FIG. 1, the interior surface of one of the casing parts, in this case part 10, can be provided with projections positioned to engage the cassette reel hubs when the case is closed in order to hold cassette 20 in place.

The basic construction of the case in the second exemplary embodiment according to FIG. 3 is similar to that of FIGS. 1 and 2, namely a holder 32 is pivotably held between an upper part 30 and a lower part 31. In this exemplary embodiment, two hinge axes X1 and X2 are provided, upper part 30 is provided, for example by injection molding, with two inwardly-facing pins 30A which extend along axis X2 and engage in corresponding holes 32A in holder 32 and lower part 31 is provided, also possibly by injection molding, with two inwardly-facing pins 31A which extend along axis X1 and engage in corresponding holes 32B in holder 32.

Holder 32 is closed along its rear edge and forms the rear wall of the case.

In contradistinction to the first exemplary embodiment, no separate strips are provided here as spring elements. Rather two strips 33A and 33B are formed on holder 32, and in particular integrally with it, the strips being bent to open outwardly in scissors fashion so that when the case is closed strips 33A and 33B tend to push parts 30 and 31 apart.

In the exemplary embodiment shown in FIG. 3 opening movement is prevented by a closure element 34 on the front face of the case, the closure element having a latch 34A mounted on upper part 30 to latch into a corresponding groove or recess 34B in lower part 3 Finger pressure on the exterior surface of closure element 34, indicated by the vertical broken lines, causes latch 34A to move backward out of groove 34B so that the action of spring elements 33A, 33B causes the case to snap open and to present the cassette (not shown in FIG. 3) in holder 32 for removal.

Retaining tabs 35A and 35B are formed in upper part 30 of the case for engaging the hub region of the audio cassette and holding it in place.

Economy of material utilization is enhanced by embodying the spring elements 33A and 33B as strips. To further conserve material, it is also conceivable that portions of upper and/or lower parts 30,31 can be eliminated in the regions coextensive with the upper and lower walls of holder 32 so that these holder walls can serve as parts of the outer walls of the case.

This application relates to subject matter disclosed in Federal Republic of Germany Application No. P 37 36

239.9-27, filed on Oct. 27, 1987, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A case for storing and completely enclosing a recording medium when the medium is not in use, said case comprising: a housing composed of an upper housing part and a lower housing part; a holder for retaining the recording medium, said holder being disposed between said upper and lower parts; hinge means connected for permitting relative movement between said upper and lower parts about a hinge axis between a closed position in which said parts are closely adjacent one another and an open position in which said parts are pivoted away from one another; closure means for retaining said parts in said closed position, said closure means being manually operable for permitting said parts to move to said open position; and spring means interposed between, and connected to one of, said holder and one of said parts for moving said parts to said open position and placing said holder in a position in which a recording medium retained by said holder is presented for removal when said closure means is manually operated.

2. A case as defined in claim 1 wherein said spring means comprise at least one spring element having a first end connected to one of said holder and one of said parts and a second end which bears resiliently against and is movable relative to the other one of said holder and one of said parts.

3. A case as defined in claim 1 wherein said holder is mounted in said case for pivotal movement about said hinge axis.

4. A case as defined in claim 1 wherein said spring means comprise at least one S-shaped strip interposed between one of said parts and said holder.

5. A case as defined in claim 1 wherein said closure means comprise at least one snap closure disposed between said upper and lower parts and composed of an elastic member secured to one of said parts and a recess formed in the other one of said parts for engagement by said elastic member when said parts are in said closed position.

6. A case as defined in claim 1 wherein said housing parts and said holder are formed such that said holder defines an outer wall of said case.

* * * * *